United States Patent
Preus et al.

[15] 3,667,235
[45] June 6, 1972

[54] CONVERTIBLE BARRIER FOR SUBSTANCES FLOATING ON WATER

[72] Inventors: Paul Preus, P.O. Box 1002, Toms River, N.J. 08753; John J. Gallagher, 252 Burley Road, Annapolis, Md. 21401

[22] Filed: Apr. 27, 1971

[21] Appl. No.: 137,799

[52] U.S. Cl. ................................................61/1, 210/242
[51] Int. Cl. .........................................................B63b 35/00
[58] Field of Search..................210/83, 242, DIG. 21; 61/1 F

[56] References Cited

UNITED STATES PATENTS

| | | |
|---|---|---|
| 3,499,290 | 3/1970 | Smith ........................................61/1 F |
| 3,537,587 | 11/1970 | Kain ........................................210/242 |
| 3,584,462 | 6/1971 | Gadd ........................................61/1 F |

*Primary Examiner*—Reuben Friedman
*Assistant Examiner*—T. A. Granger
*Attorney*—John J. Gallagher

[57] ABSTRACT

A barrier for substances floating on water having a flotation member and a liquid pervious and a liquid impervious skirt depending therefrom. The liquid impervious skirt is deflected at currents greater than about one knot and the oily substances are treated with a particulate oleophilic-hydrophobic substance less dense than water for retention by said liquid pervious skirt.

6 Claims, 7 Drawing Figures

PATENTED JUN 6 1972          3,667,235
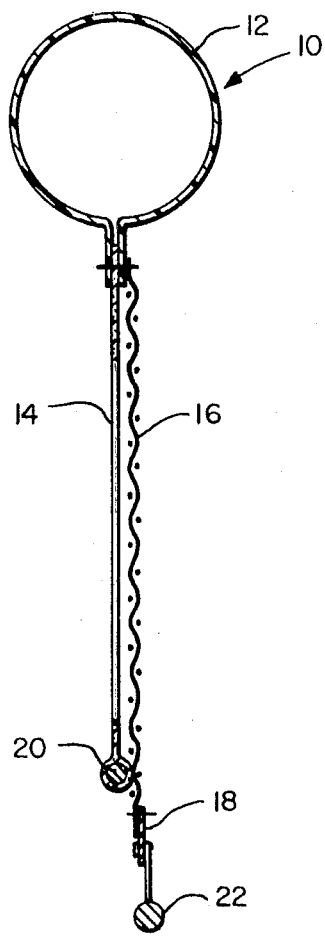
FIG. 1
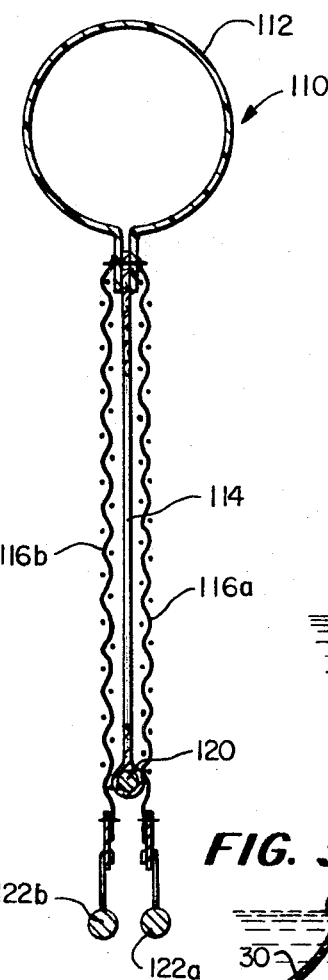
FIG. 2
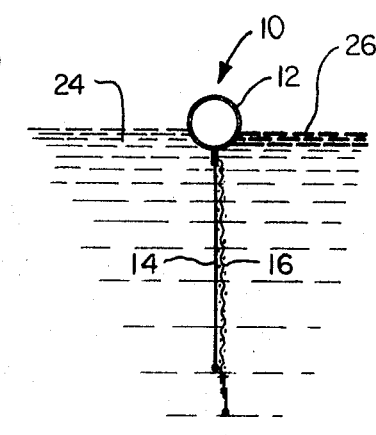
FIG. 3
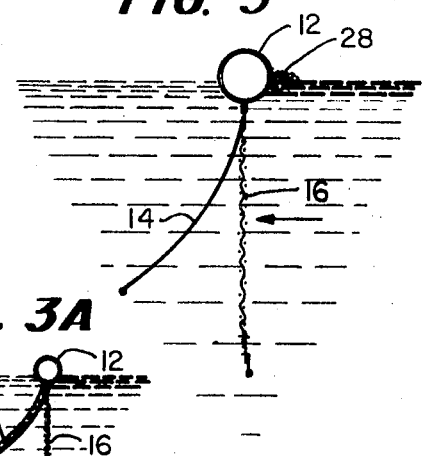
FIG. 3A
FIG. 4
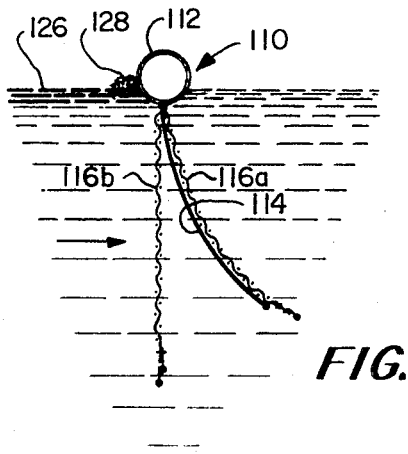
FIG. 5
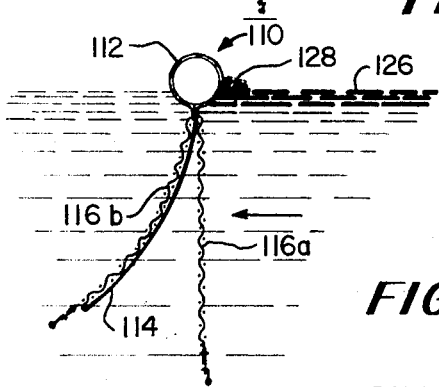
FIG. 6
INVENTORS
PAUL PREUS
JOHN J. GALLAGHER
BY John J. Gallagher
ATTORNEY

CONVERTIBLE BARRIER FOR SUBSTANCES FLOATING ON WATER

BACKGROUND OF THE INVENTION

Floating barriers having liquid impervious skirts have been found to be ideal for containing and controlling substances floating on water where the water is substantially free of currents and wave action. Such barriers find particular utility in the control of oil slicks on bodies of water where the water conditions so permit.

Where currents and/or wave action are present in the body of water, however, liquid impervious skirts have proved to be ineffective in retaining, controlling or confining hydrocarbon slicks. Because of the impervious nature of the barrier, the skirt must withstand great hydrodynamic forces without failing structurally or deflecting to a horizontal position thereby allowing the slick to pass under the barrier.

Even where suitable structural strength and ballasting weight are provided to avoid the above failures, it has been found that currents greater than about one knot perpendicular to the boom form vortexes which draw floating hydrocarbons under the barrier, thereby effectively circumventing the effectiveness of the barrier.

In applicant's copending application, Ser. No. 214, filed Jan. 2, 1970, for Control of Waterborn Oil Slicks, a system is disclosed which overcomes some of the disadvantages of the prior art by providing a barrier having a fluid pervious skirt which, in conjunction with a particulate oleophilic-hydrophobic material such as that disclosed in applicant's copending application, Ser. No. 83,640 filed Oct. 24, 1970, for Process of Separating Hydrocarbons from Water, passes water and retains hydrocarbons absorbed in the material.

SUMMARY OF THE INVENTION

This invention furnishes a barrier which overcomes the disadvantages of the prior art by providing a floating boom having a water impervious skirt for containing oil slicks or the like in substantially still water and a water pervious skirt for containing oil slicks on water having wave or current movement therein. This invention also provides a barrier which adapts to control oil slicks under any water condition by furnishing a floating boom having water pervious and water impervious skirts, the water impervious skirt deflecting in the presence of currents which would otherwise channel floating oil therepast.

The invention further provides an adaptable barrier for controlling oil slicks in which the water pervious skirt is maintained in a flow intercepting position to act, with a particulate oleophilic-hydrophobic material less dense than water, to filter oil from water flowing therethrough.

In a preferred embodiment, this invention includes a flotation means with at least one liquid pervious skirt depending therefrom and a liquid impervious skirt depending from the flotation means in parallel planar relationship to the liquid pervious skirt.

These and other objects and advantages of this invention will become better understood to those skilled in the art by reference to the following detailed description when viewed in light of the accompanying drawing wherein like components throughout the figures are indicated by like numerals and wherein:

BRIEF DESCRIPTION OF THE DRAWING

FIG. 1 is a sectional view through a barrier in accordance with the invention;

FIG. 2 is a view similar to FIG. 1 showing another embodiment of the invention;

FIGS. 3 through 4 are reduced views of the embodiment of FIG. 1 illustrating the operation thereof; and FIGS. 5 and 6 are views similar to FIGS. 3 and 4 illustrating the operation of the embodiment of FIG. 2.

In FIG. 1, a barrier, shown generally at 10, comprises a flotation collar 12 with a liquid impervious skirt 14 and a liquid pervious skirt 16 depending therefrom in parallel- planar, coextensive relationship. The flotation collar may be an inflatable tube as illustrated or may be of a flotable material such as polystyrene or polyethylene foam, or an oleophilic-hydrophobic material such as disclosed in applicant's copending application, Ser. No. 214. The skirt 14 may be made of any liquid impermeable material having suitable resistance to the environment in which the barrier is likely to be used and suitable flexibility to follow wave and current action and to allow handling and storage thereof.

The skirt 16 is fabricated from a liquid pervious or permeable material such, for example, as a net having a mesh of between one-eighth inch and one-quarter inch. As disclosed in applicant's copending application, Ser. No. 214 filed Jan. 2, 1970, such a skirt may be reinforced with horizontal and vertical structural members (not shown) of some strong, flexible material such as nylon webbing or the like. Any material permeable to water, whether perforated sheet material or woven netting, which has suitable flexibility and is compatible with the environment in which the device is to be used is suitable for use in the skirt 16. A horizontal strip of webbing 18 provided with grommets is attached to the lower edge of the skirt 16, and a series of ballast elements 22, suitable to maintain the skirt 16 in a horizontal configuration against all current action and water force are attached to the lower edge of the skirt 16.

The skirt 14 has, formed along the lower edge thereof, a ballast member 20. This ballast member may take the form of sand, lead shot or segments of heavy material either incorporated within the skirt or added onto the lower edge, as desired. The size and disposition of the member 20 is important to this invention in that, as was described above, water tends to vortex beneath liquid impermeable skirts at current velocities much in excess of one knot normal to the skirt. The ballast member should therefore be designed to maintain the verticality of the impermeable skirt 14 at current velocities normal to the skirt below about one knot. Such design, dependent upon factors such as density and quantity of the ballast material, height and inherent weight of the skirt, and the total presented area of the skirt, is well within the capabilities of those skilled in the art.

The ballast elements 22 should be of sufficient weight to maintain the verticality of the permeable skirt 16 under all current and sea conditions. Due to the permeability of the skirt 16, and the reduced water forces acting thereon, it is conceivable that, with certain design parameters, the ballast elements 22 and the ballast members 20 could be of about the same unit weight and still accomplish their respective objectives.

With reference to FIGS. 3 and 4, the operation of the barrier of FIG. 1 is illustrated. With the barrier 10 disposed in a body of water 24 having a quantity of oil 26 floating thereon and relatively little or no current therein, the skirts 14 and 16 depend vertically in substantially parallel relationship and the barrier functions in a manner substantially identical to that of conventional liquid impermeable skirted booms. Upon the advent of or in the presence of a current much in excess of about one knot in the direction shown by the arrow in FIG. 3, the impermeable skirt 14 is deflected with the current as shown and the permeable skirt 16 remains to provide a barrier for the oil 26. Where the oil 26 is low in viscosity or when the floating substance is some other less viscous material such as gasoline or the like, the leading edge of the material is preferably thickened up with an oleophilic-hydrophobic material 28 as was described in applicant's copending application, Ser. Number 83,640. The deflected skirt 14 assumes a position regardless of the current force, which blocks or otherwise entraps bloom oil traces which may be expressed or otherwise bypass the barrier 10. In this respect, it is conceivable that the skirt 14 could be fabricated from a mat of the above-described oleophilic-hydrophobic material which could be replaced after use. In this respect, FIG. 3a illustrates, in reduced section, a variation of the embodiment of FIG. 1 wherein the skirt 14 is composed of a mat or blanket 30 of that material. Such a mat will serve as a back-up to absorb trace oil filtering past the material 28 while avoiding the imposition of large drag forces or the initiation or vortexing thereunder which would occur if the mat were to be maintained in a vertical configuration.

In FIG. 2, another embodiment of the invention having dual liquid pervious skirts is illustrated. In this embodiment, components thereof corresponding to like components of the embodiment of FIG. 1 are indicated by like numerals only of the next higher order. In this embodiment, the impervious skirt 114 has, disposed in either side thereof, pervious skirts 116a and 116b with their independent ballasts 122a and 122b, respectively. Such an arrangement has particular advantage in tidal areas where current reverses direction with tidal periods. As seen in FIG. 5, with the current in the direction indicated by the arrow, the impervious skirt 114 is deflected away from the pervious skirt 116b leaving it vertically suspended from the flotation collar 112 and deflecting pervious skirt 116a with it. In FIG. 6, the current is in the opposite direction reversing the deflection of the skirt 114 such that the pervious skirt 116a remains vertical and the skirt 116b is deflected. By this means, a liquid pervious skirt always remains positioned to block flow of oil 126 and absorbent material 128 regardless of the direction of the current.

What has been set forth above is intended primarily as exemplary to enable those skilled in the art in the practice of the invention.

What is new and desired to be protected by Letters Patent of the United States is:

1. A floating barrier for blocking the migration of oil on the surface of a body of water and the vortexing of oil under the barrier under the influence of currents in said body comprising:

floatation means adapted to float on the surface of said body;

a first elongated liquid permeable skirt with an upper end and a lower end, said first skirt disposed to freely depend by said upper end from said floatation means with said lower end below said surface, weight means associated with said lower end to maintain said first skirt substantially vertical under the influence of said currents;

a second elongated liquid impermeable skirt with a top end and a bottom end, said second skirt disposed to freely depend by said top end from said floatation means with said bottom in closely spaced parallel relation to the lower end of said first skirt;

weight means associated with the bottom end of said second skirt adapted to maintain said second skirt substantially vertical in the absence of currents in said body of water and to provide deflection and displacement of away from the lower end of said first skirt under the influence of currents of magnetude sufficient to vortex oil under said second skirt whereby migration of oil on the surface of said body of water is blocked and vortexing of oil under said barrier under the influence of currents is avoided.

2. A barrier in accordance with claim 1 wherein two of said liquid permeable skirts depend from said flotation means and said liquid impermeable skirt is disposed therebetween.

3. A barrier in accordance with claim 1 wherein said liquid impermeable skirt is coextensive with said liquid permeable skirt.

4. A barrier in accordance with claim 1 further comprising a particulate oleophilic-hydrophobic material disposed in the water on the upstream side of said barrier, said material having a greater effective particle size than the openings providing liquid perviousness in said liquid pervious skirt.

5. A barrier in accordance with claim 1 wherein said liquid permeable skirt comprises a net of about one-quarter inch mesh.

6. A barrier in accordance with claim 1 wherein said liquid impermeable skirt comprises a mat of oleophilic-hydrophobic material.

* * * * *